(12) United States Patent
Phély

(10) Patent No.: US 12,035,651 B2
(45) Date of Patent: Jul. 16, 2024

(54) SCRAPER WHEEL FOR SOWING

(71) Applicant: OTICO, Chalmaison (FR)

(72) Inventor: Olivier Phély, Chalmaison (FR)

(73) Assignee: OTICO, Chalmaison (FR)

( * ) Notice: Subject to any disclaimer, the term of this patent is extended or adjusted under 35 U.S.C. 154(b) by 768 days.

(21) Appl. No.: 17/114,709

(22) Filed: Dec. 8, 2020

(65) Prior Publication Data
US 2021/0168992 A1    Jun. 10, 2021

(30) Foreign Application Priority Data
Dec. 9, 2019    (FR) ...................... 19 13998

(51) Int. Cl.
*A01C 5/06*    (2006.01)
*A01C 7/20*    (2006.01)

(52) U.S. Cl.
CPC ............... *A01C 5/064* (2013.01); *A01C 5/06* (2013.01); *A01C 7/203* (2013.01)

(58) Field of Classification Search
CPC ......... A01B 15/16; A01B 26/06; A01B 23/06; A01C 5/064; A01C 5/06; A01C 7/203
USPC ................ 172/558, 559, 560, 561, 562, 563
See application file for complete search history.

(56) References Cited

U.S. PATENT DOCUMENTS

| | | | |
|---|---|---|---|
| 4,669,550 A * | 6/1987 | Sittre ..................... | A01B 15/16 111/164 |
| 5,533,793 A | 7/1996 | Walker | |
| 6,637,486 B1 * | 10/2003 | Rolla ..................... | B60C 17/04 152/381.6 |
| 8,720,351 B1 * | 5/2014 | Wipf ....................... | A01C 7/203 172/578 |
| 9,474,203 B2 * | 10/2016 | Anderson .............. | A01C 5/068 |
| 10,136,572 B2 * | 11/2018 | Weisz .................... | A01C 5/064 |
| 2007/0062714 A1 * | 3/2007 | Harmon ................ | A01C 5/064 172/566 |

(Continued)

FOREIGN PATENT DOCUMENTS

| | | |
|---|---|---|
| AR | 053782 A1 | 5/2007 |
| DE | 33 36 823 A1 | 4/1985 |

(Continued)

OTHER PUBLICATIONS

French Preliminary Search Report dated Aug. 6, 2020 in French Application 1913998 filed on Dec. 9, 2019 (with English Translation of Categories of Cited Documents), 3 pages.

*Primary Examiner* — Jamie L McGowan
(74) *Attorney, Agent, or Firm* — Oblon, McClelland, Maier & Neustadt, L.L.P.

(57) ABSTRACT

An agricultural wheel includes a body including a rim, and a semi-hollow-type tire including a flexible case including a sheath and a tread. The rim includes a seat section, suitable for receiving the tire, and a tool section, suitable for scraping the seed drill disc. The tread has a profile domed towards the outside of the tire. The case includes a first sidewall, close to the tool section, connecting the sheath to the tread. The sidewall extends radially or slightly inclined radially. The rim includes an intermediate axial section which connects the tool section to the seat section. The intermediate section is shaped as an axial stop for the tire which is form fitted with the first sidewall. The tire is mounted on the seat section by means of the sheath in an axially stressed state which maintains the first sidewall in contact against the stop.

16 Claims, 15 Drawing Sheets

(56) References Cited

U.S. PATENT DOCUMENTS

Figure 5:
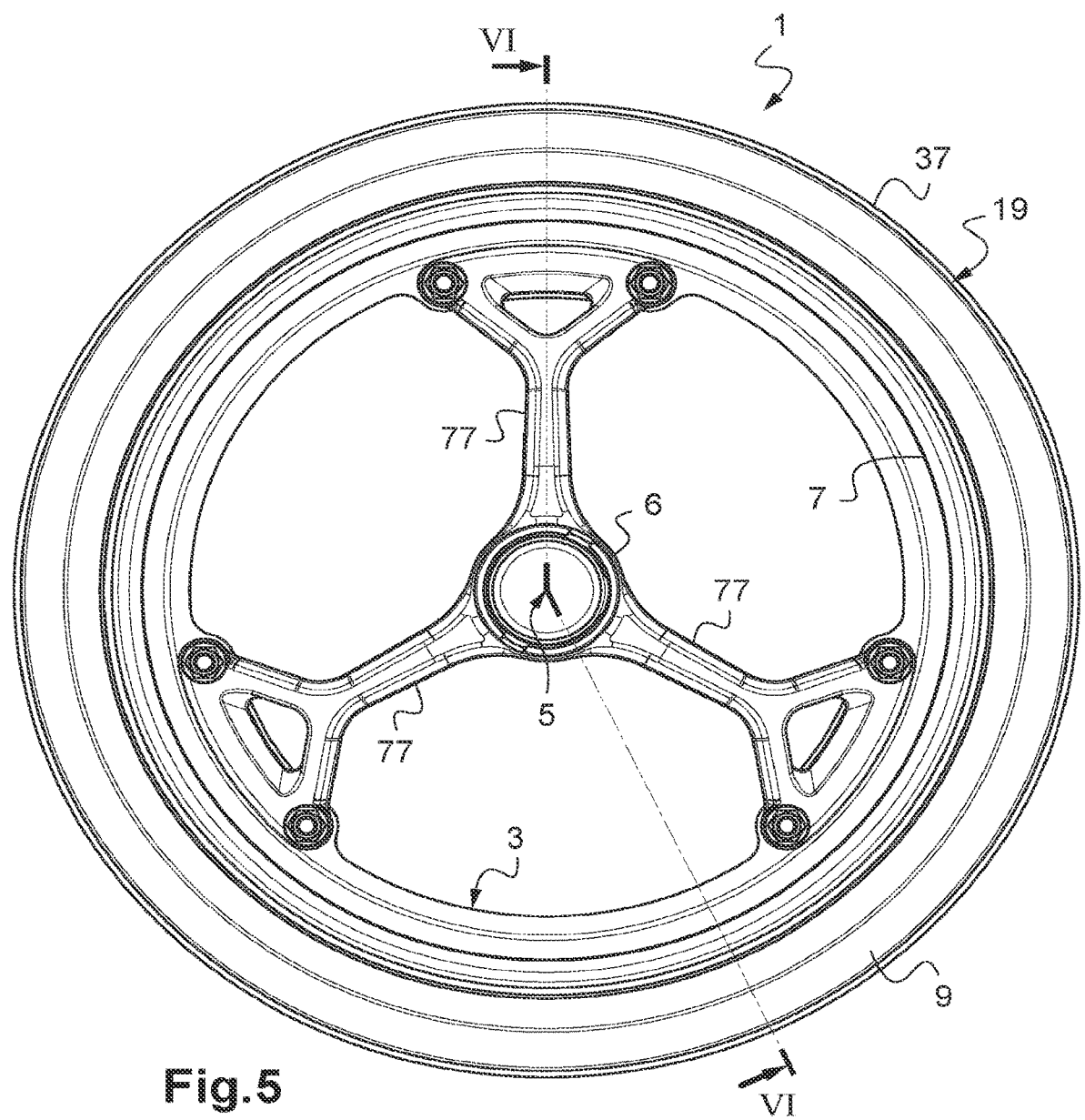

| | | | | |
|---|---|---|---|---|
| 2010/0251947 A1* | 10/2010 | Mariman | ............... | B60C 7/26 |
| | | | | 152/379.3 |
| 2011/0108295 A1* | 5/2011 | Schilling | ............... | A01C 5/068 |
| | | | | 172/558 |
| 2011/0108296 A1* | 5/2011 | Schilling | ............... | A01B 23/06 |
| | | | | 111/163 |
| 2013/0092307 A1* | 4/2013 | Tho | ............... | B60C 15/02 |
| | | | | 152/450 |
| 2014/0014377 A1* | 1/2014 | Hesla | ............... | A01C 5/068 |
| | | | | 172/558 |
| 2014/0123886 A1* | 5/2014 | Schilling | ............... | A01C 7/205 |
| | | | | 111/163 |
| 2014/0124112 A1 | 5/2014 | Phely et al. | | |
| 2017/0208734 A1* | 7/2017 | Weisz | ............... | A01C 7/203 |
| 2017/0355229 A1 | 12/2017 | Phely | | |
| 2023/0052891 A1* | 2/2023 | Kroth | ............... | A01B 23/06 |

FOREIGN PATENT DOCUMENTS

| | | |
|---|---|---|
| EP | 1 238 824 A1 | 9/2002 |
| EP | 3 257 345 A1 | 12/2017 |

\* cited by examiner

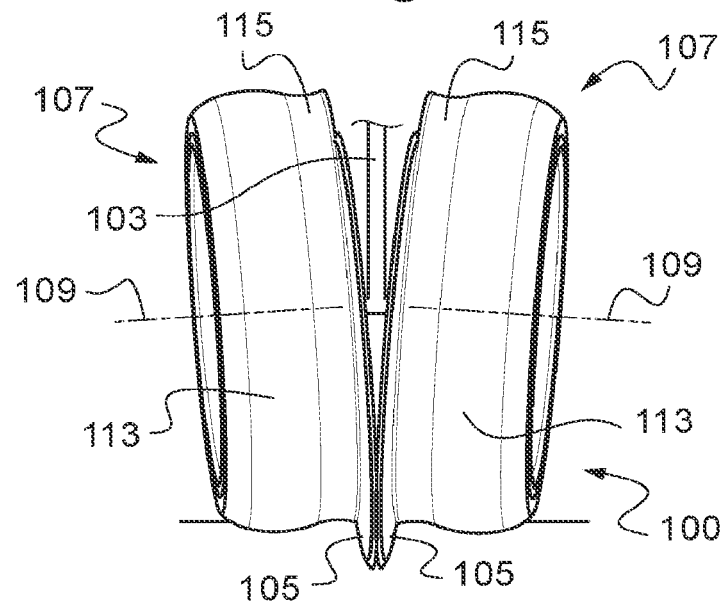
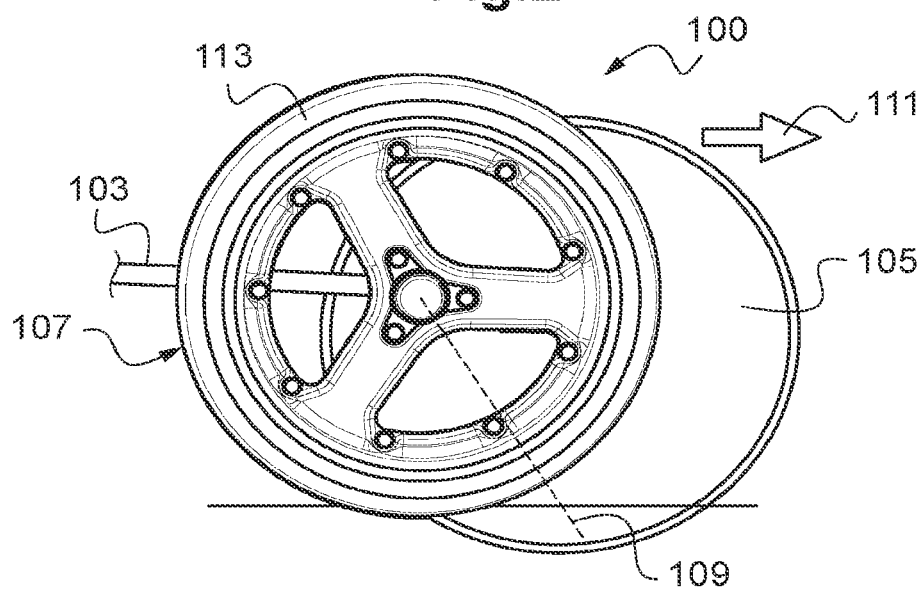

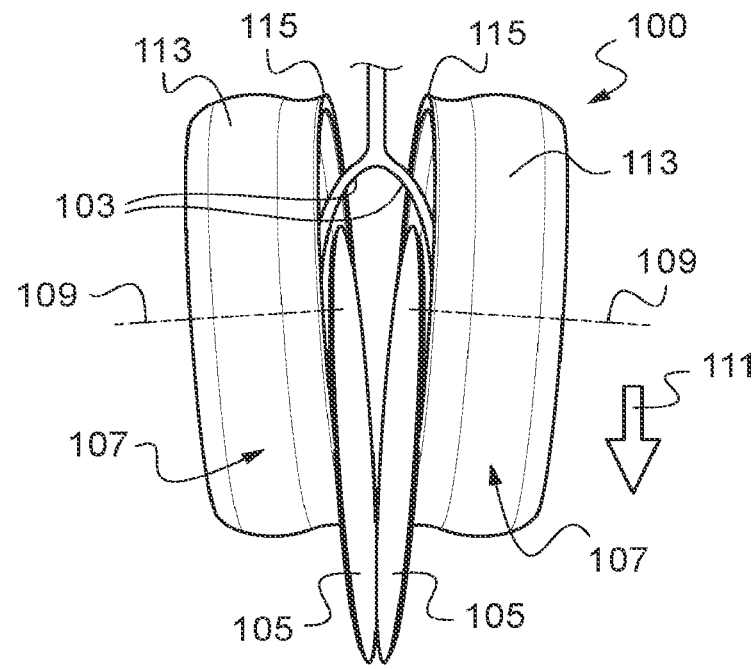
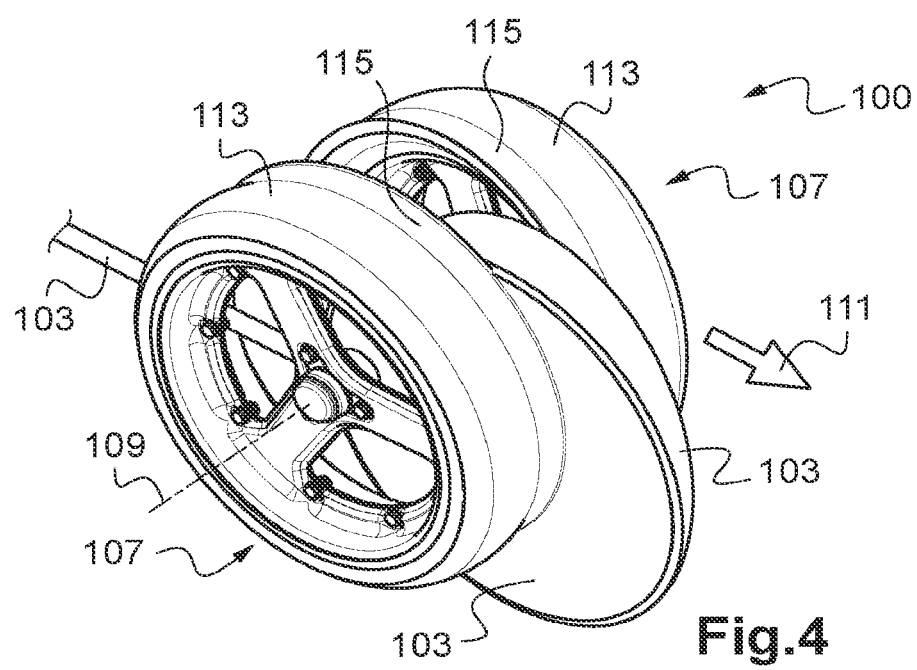

SCRAPER WHEEL FOR SOWING

The invention relates to an agricultural wheel and more particularly to a wheel which forms the accessory of a seed drill disc.

A seed drill is an agricultural machine that is used in a field to seed grain therein. This machine conventionally takes the form of a hitch which is moved across the field using a tractor or the like. A seed drill can have a fairly complex constitution, made of several portions, each of these portions being adapted to a specific operation. Conventionally, a seed drill thus comprises a portion intended to open one or more furrows in the ground, for example by means of coulters, discs or teeth, a portion intended to deposit seed or grains in these furrows and a portion intended to close these furrows or compact the soil, after the seed or the grains have been deposited therein.

To open the furrows, some seed drills are equipped with disc-shaped tools, generally mounted in pairs on the hitch, which, by rolling, penetrate the ground so as to spread the soil.

It is known to add to these discs, as an accessory, an agricultural wheel comprising a body carrying a rim and a tire slipped on the body, around this rim. This wheel allows to adjust the working depth of the discs, keeping their active portion at a substantially constant depth when the seed drill is moved. This is referred to as "gauge wheel" in the art.

Most often, the tire is of the type called "semi-hollow" type. Such a tire comprises a case made of flexible material around a chamber left empty. One or more orifices through this case maintain the chamber in fluid communication with the outside of the tire. As a result, the case has a high capacity for deformation during work, a deformation which contributes to cleaning the tire, or at least to preventing soil from accumulating therein.

In at least some circumstances, soil tends to accumulate on the seed drill discs when they are working, making them less efficient. To clean these discs, it is known to use gauge wheels with semi-hollow tires, the profile of which comprises a lip which protrudes, at least axially, from the rest of the case. This lip is arranged so as to rub against a disc of the seed drill, or to scrape it, taking advantage of a relative rotational movement between the gauge wheel and the disc.

Examples of lip tires of this type, a lip that can be described as a "scraper", are disclosed by FR 2 885 008 A1 and FR 3 017 265 A1 in the name of the applicant, and also U.S. Pat. No. 5,533,793 in the name of Walker.

These tires are generally satisfactory.

Under some working conditions, however, for example when the ground is composed of clayey or sticky soil, the scraper lip is not fully satisfactory, in particular because of its flexibility. The cleaning effect produced by such a lip may prove to be insufficient.

Under such conditions in particular, it is a known practice to use, as a replacement for the scraper lip, a rigid crown, usually metallic, integral with the gauge wheel. The tire then generally has no scraper lip. This crown can be attached to the body of the gauge wheel, by means of a part which occupies the dish of this wheel. The crown can also be integrated into the rim, as an axial portion thereof, in the continuation of the seat, as in AR053781 A1 in the name of Pierobon for example. This allows to preserve the wheel dish, which can remain hollow, at least in part.

The use of a rigid crown significantly improves the cleaning of the seed drill discs. However, this use induces a difficulty: since the portion of the rim comprised between the scraper crown and the tire contacts the ground, the soil also tends to accumulate therein, so that it is necessary to provide a sealing between the tire and the rim, at least near the crown. To this is added the soil possibly detached from the discs, which, due to a generally frusto-conical shape of the rim in the vicinity of the crown, is also found on the portion of the rim in question.

To this end, AR053781 A1 uses a tire whose case has no sidewall on the side of this tire oriented towards the crown. The tread is directly connected to the sheath. There the tire has an annular lip which protrudes axially towards the crown. This lip rests on the frusto-conical portion of the rim, which portion supports the crown. In a certain way, AR053781 A1 changes the conventional use of such a lip, from a scraper function to that of sealing.

The applicant has identified some disadvantages to the wheel according to AR053781 A1.

The lip is very exposed and remains static even when the wheel is working, which considerably weakens it. This lip deteriorates prematurely, faster than the rest of the tire wears out.

The lip also tends to leave the rim when the tire deforms. The interface between this lip and the rim opens when the wheel is working, and the soil tends to enter therein. The sealing loses its effectiveness.

To overcome these disadvantages, it is possible to use harder elastomers, which make the tire more rigid as a whole, and in particular its annular lip. However, this results in a tire which can no longer, or only poorly, be cleaned, because the deformation capacity of the case is reduced.

The invention aims at improving the situation.

An agricultural wheel forming an accessory for a seed drill disc is provided. This wheel comprises a body comprising a rim generally of a shape of revolution around a central axis and a semi-hollow-type tire comprising a flexible case around a hollow chamber, this flexible case comprising a sheath and a tread. This tread has a profile domed towards the outside of the tire. The rim comprises an axial section shaped as a seat, suitable for receiving the tire, and an axial section shaped as a tool, suitable for scraping the seed drill disc. The case includes at least a first sidewall, close to the tool section, connecting the sheath to the tread, this first sidewall generally extending radially or slightly inclined radially. The rim comprises an intermediate axial section which connects the tool section to the seat section. This intermediate section is shaped as an axial stop for the tire which is form fitted with the first sidewall. The tire being mounted on the seat section by means of the sheath in an axially stressed state which maintains the first sidewall in contact against the stop.

In this wheel, a sealing is created between the rim and the tire in the stop section, by placing the first sidewall in surface contact with this section. This contact is made under pressure because the tire is mounted on the seat in a state of lateral stress.

This contact is created as soon as the tire is mounted on the seat. When working, due to its domed shape, the tread transfers the reaction force of the ground, generally directed radially, at least on the first sidewall, in a way which tends to deform it axially, towards the stop section. This increases the contact pressure between the stop section and the first sidewall. The sealing is more effective when the wheel is working.

The tire can be produced with a flexible case, since the deformation of this case contributes to the effectiveness of the seal. Therefore, a tire with a high deformation capacity can be maintained, which is beneficial for cleaning the tire.

Optional, complementary or substitute features of the invention are set out below.

The axial stop and the first sidewall each have a rectilinear profile.

The flexible case comprises one or more portions which protrude radially from the sheath or from the tread into the hollow chamber, these portions being shaped as at least one radial stop for the tread.

At least one of these protruding portions projects from the sheath or from the tread by a height close, by greater values, to the height of the first sidewall.

At least two of the protruding portions facing one another project respectively from the sheath and from the tread and by a cumulative height close, by greater values, to the height of the first sidewall.

The tread has a top portion and the case has a median plane, and the top portion is offset from the median plane, in a direction away from the first sidewall.

The tool section comprises two generally frusto-conical axial sections from an axial edge of the rim to the axial stop, and that of these sections which is closest to said axial edge is more inclined than the other relative to a radial direction.

The wheel body comprises a first flange and a second flange mounted on top of each other, and the first flange comprises at least the tool section and the axial stop section, and the second flange comprises at least a portion of the seat section.

The first flange further comprises at least a portion of the seat section and the second flange comprises the rest of the seat section.

The flexible case includes a second sidewall, remote from the tool section, connecting the sheath to the tread.

The second sidewall generally extends radially or slightly inclined radially.

The second sidewall is in part at least significantly thicker than the first sidewall.

The tire has an annular groove, formed in the second sidewall, and the rim has a curved edge, engaged in the annular groove.

The seat section comprises at least one generally frusto-conical section which widens towards the tool section.

The body comprises a first flange and a second flange mounted on top of each other, the first flange including at least the tool section, the axial stop section and at least one generally frusto-conical section of the seat section.

The tire comprises an annular bead which projects from the flexible case where the first sidewall is connected to the tread.

Figure 6:
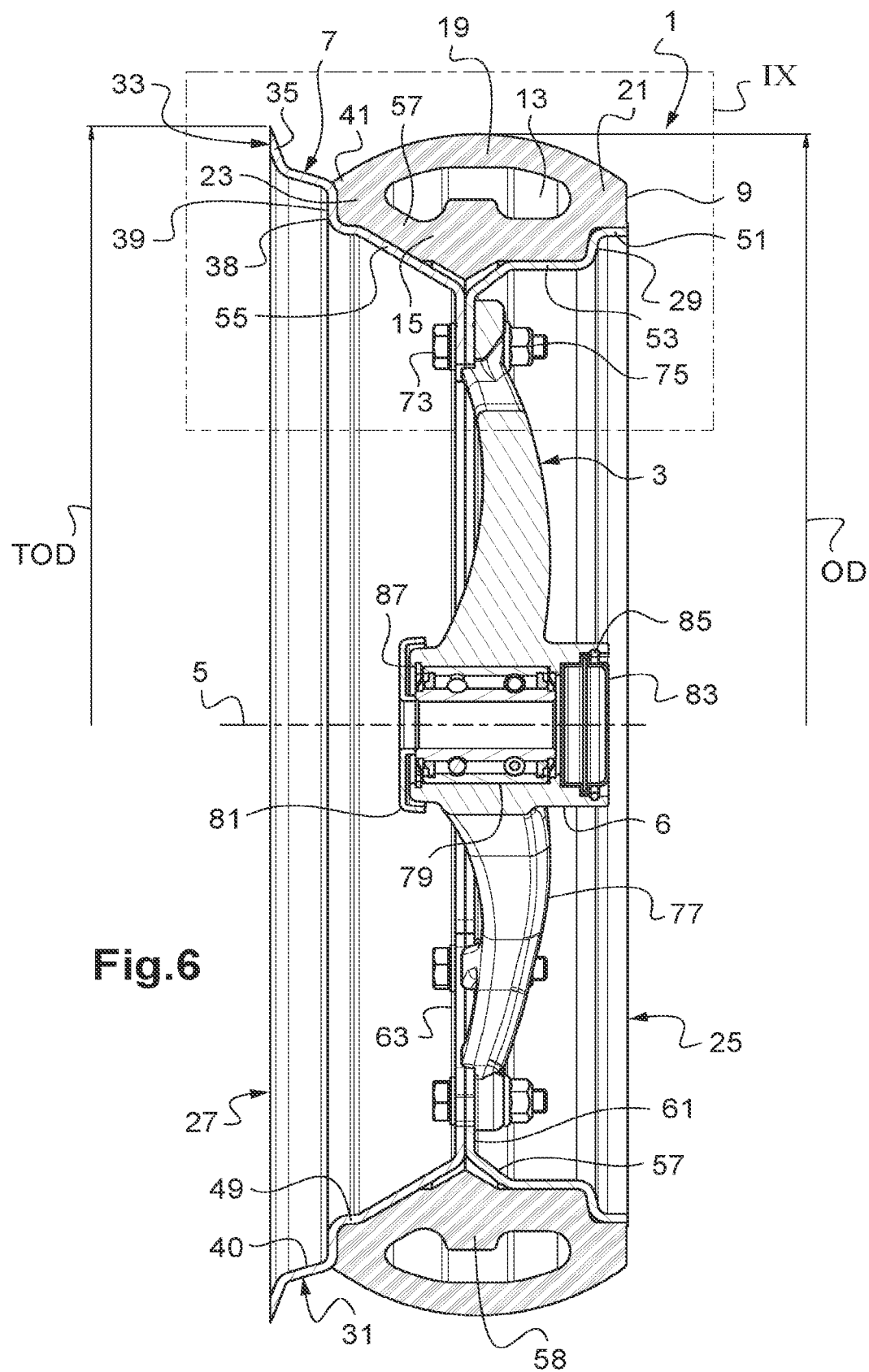
Figure 7:
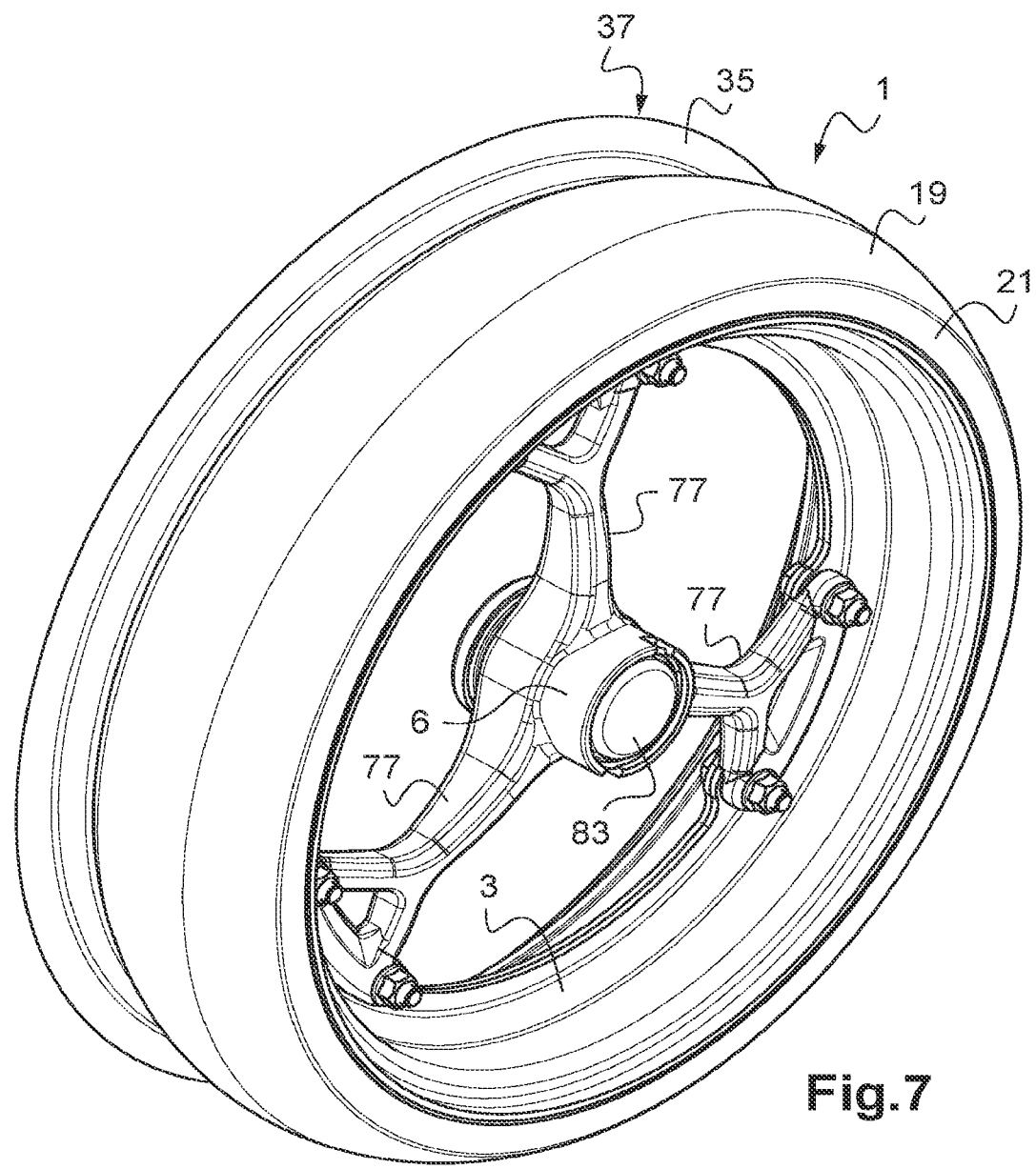
Figure 8:
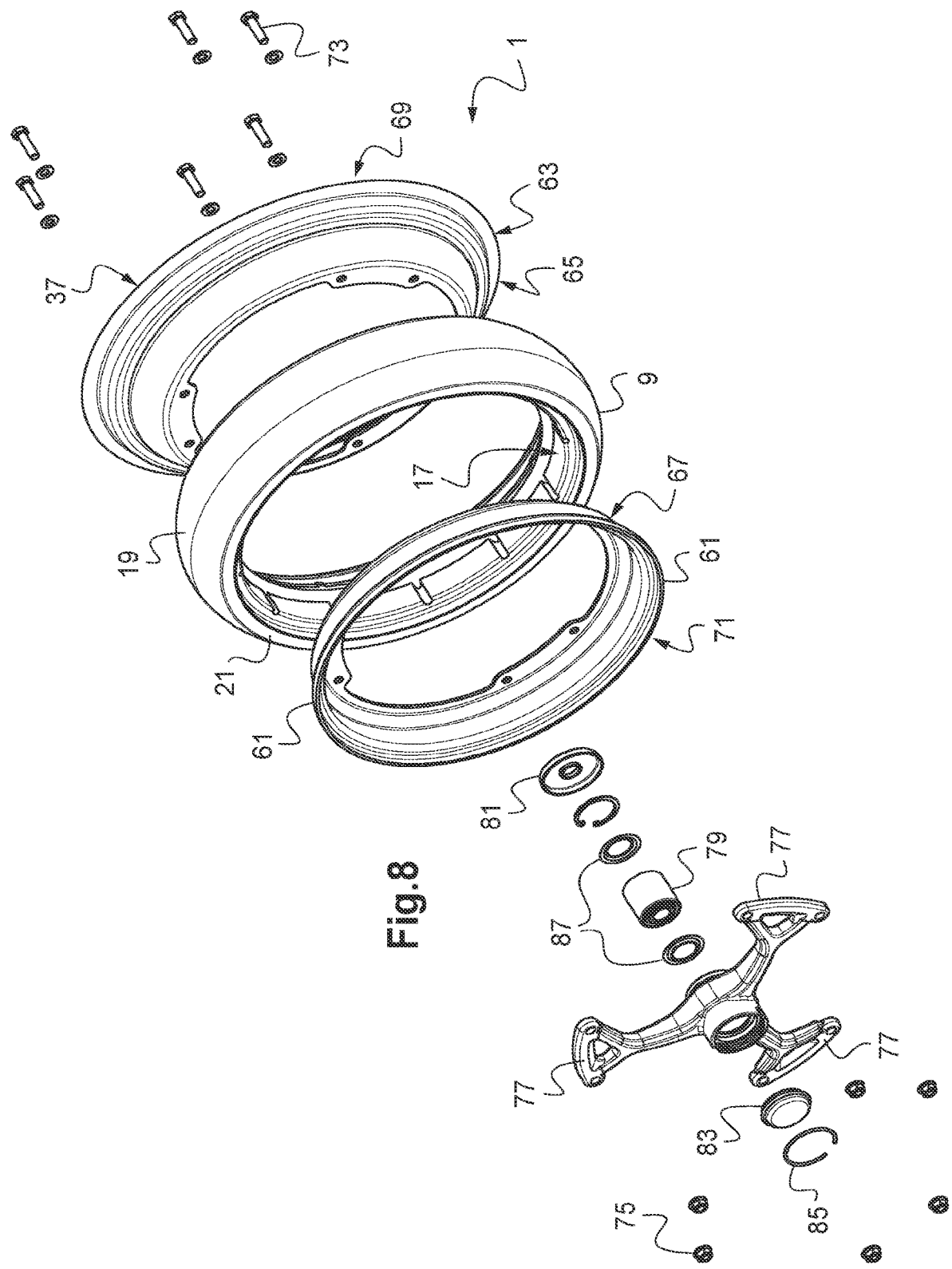
Figure 9:
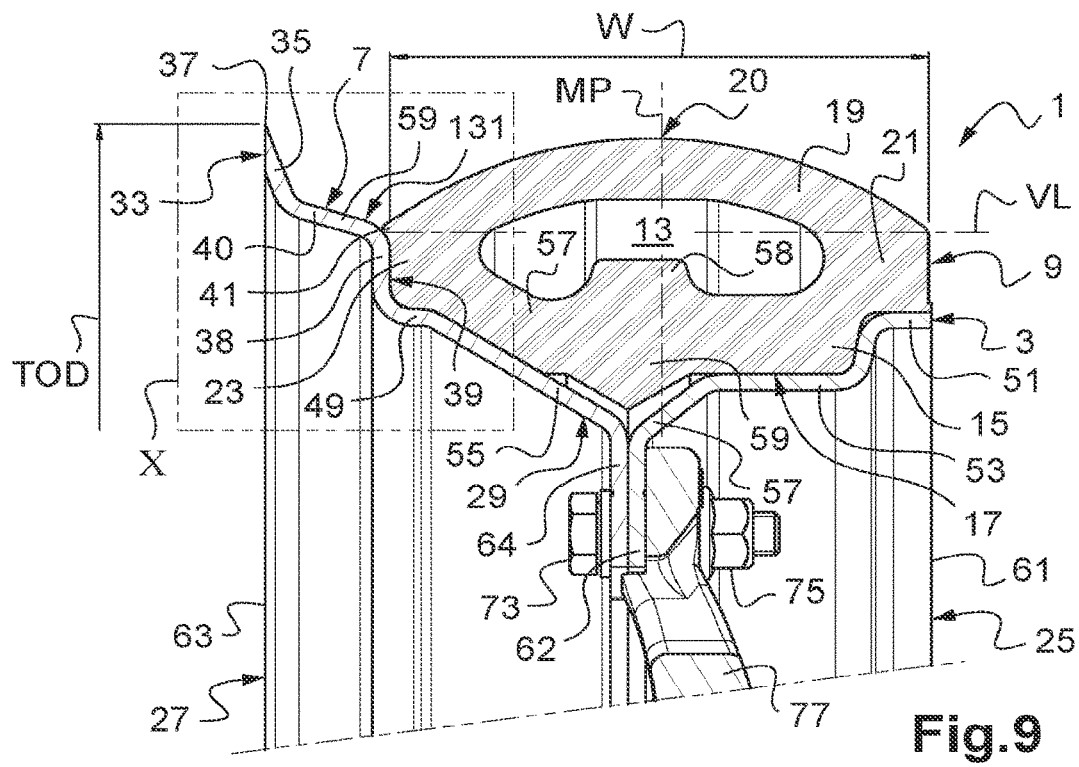
Figure 10:
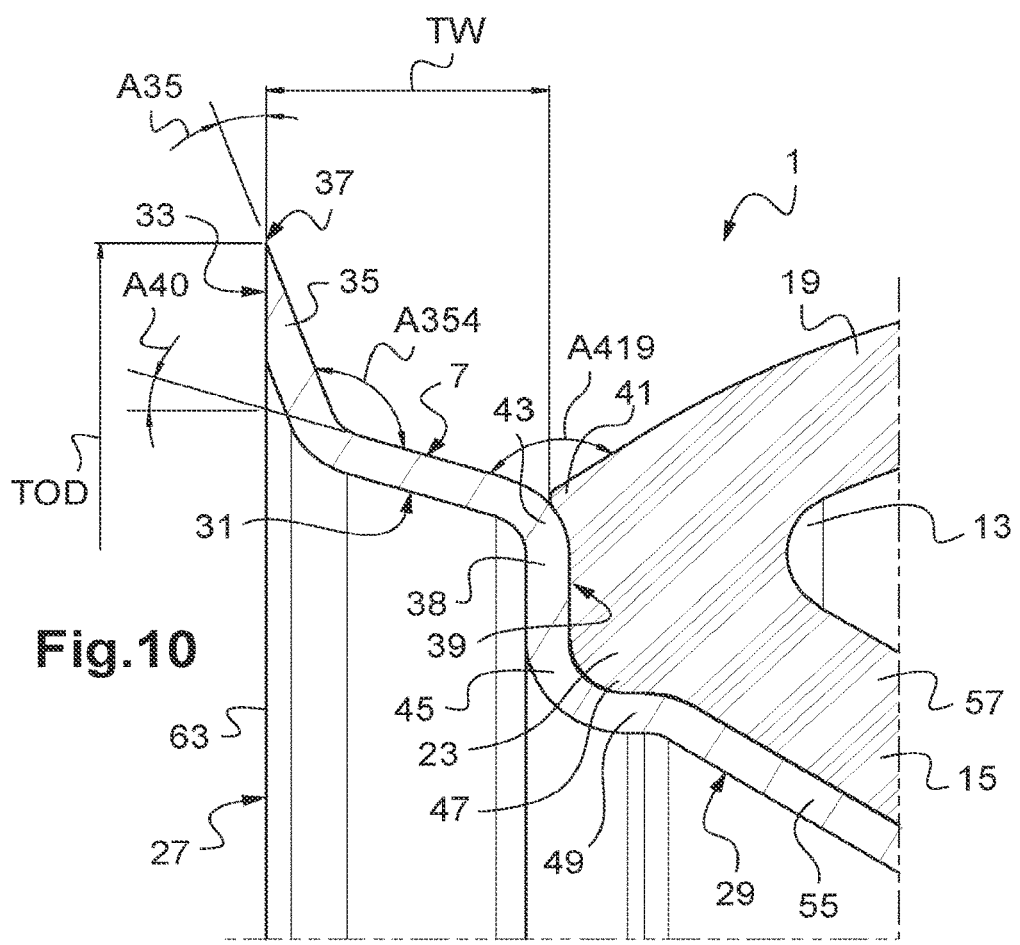
Figure 11:
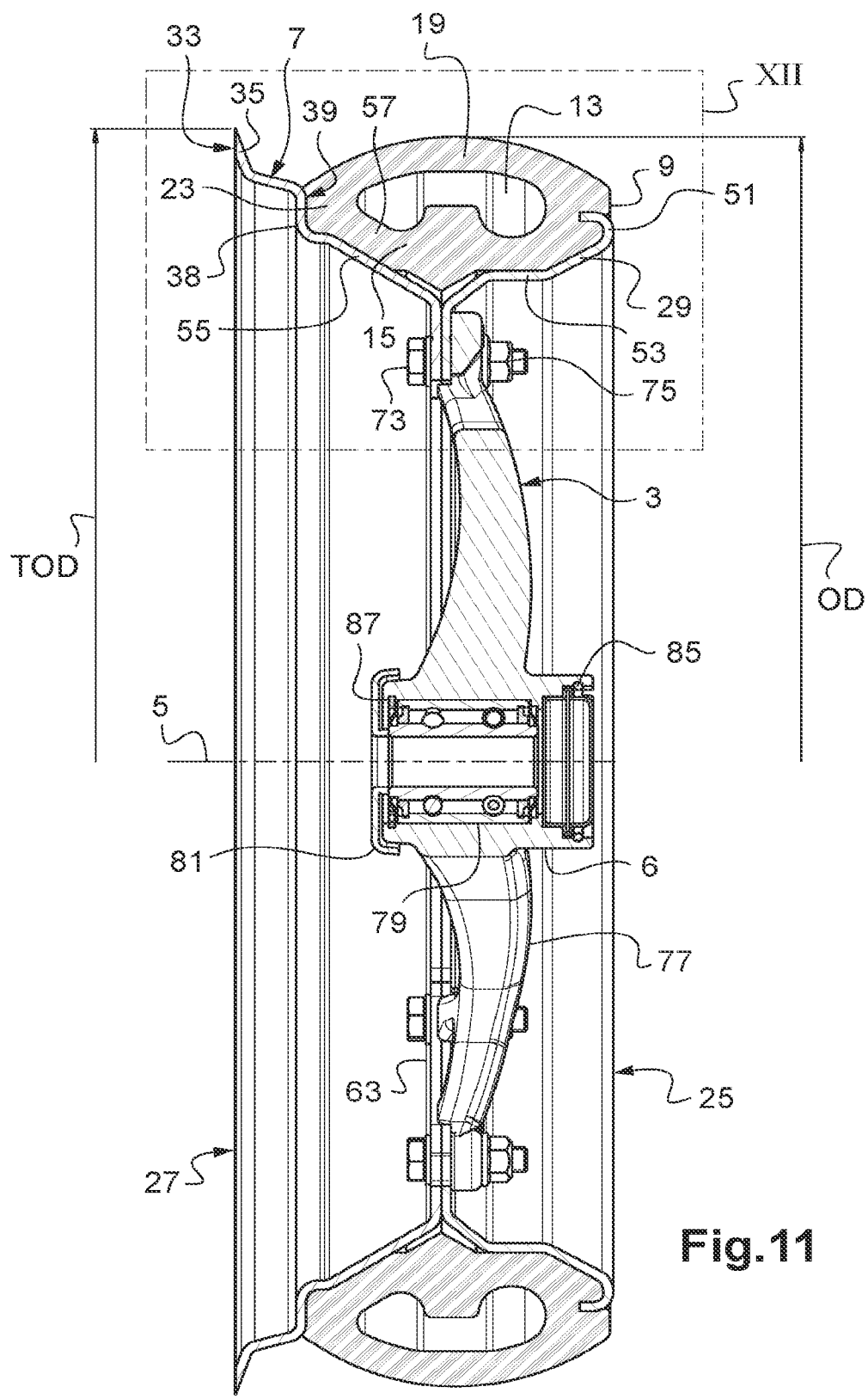
Figure 12:
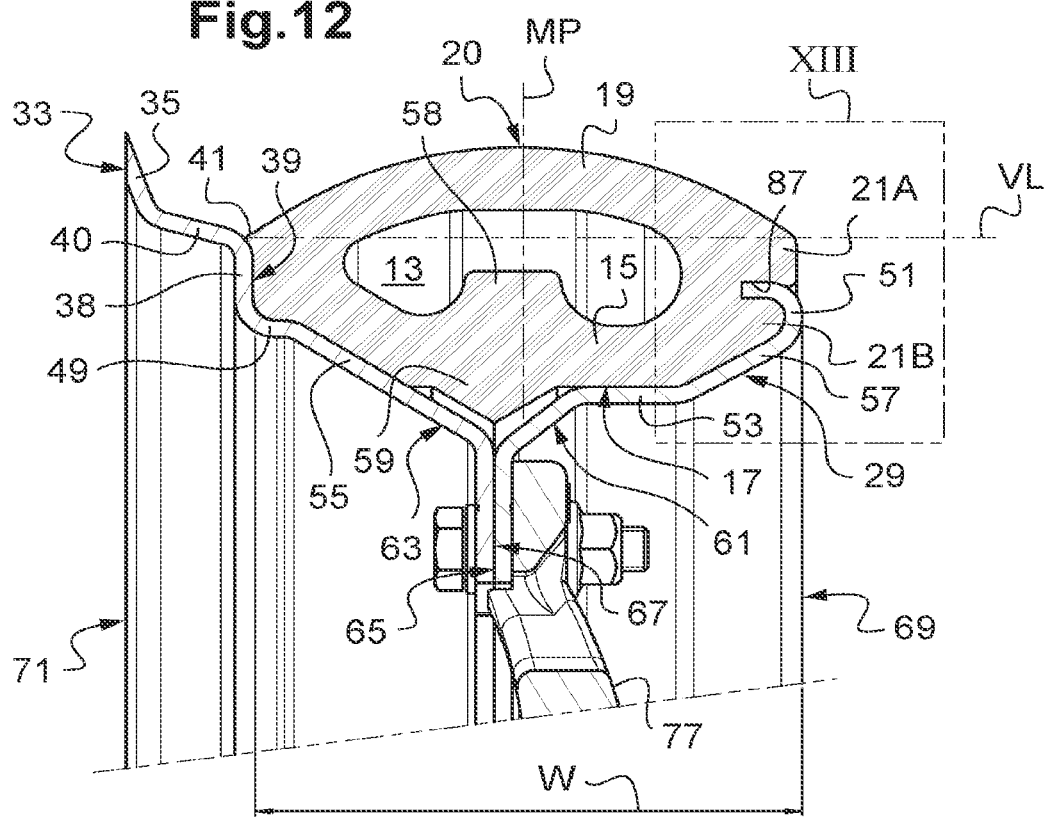
Figure 13:
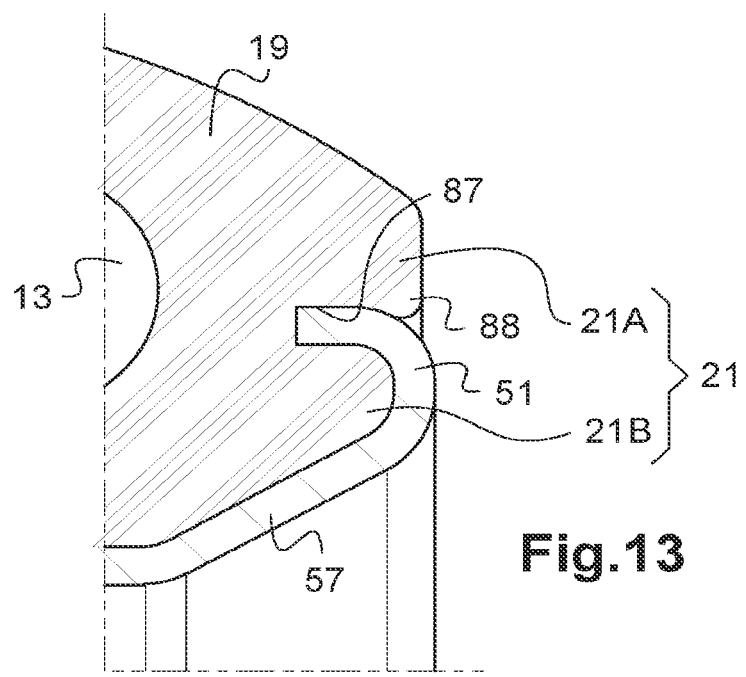
Figure 14:
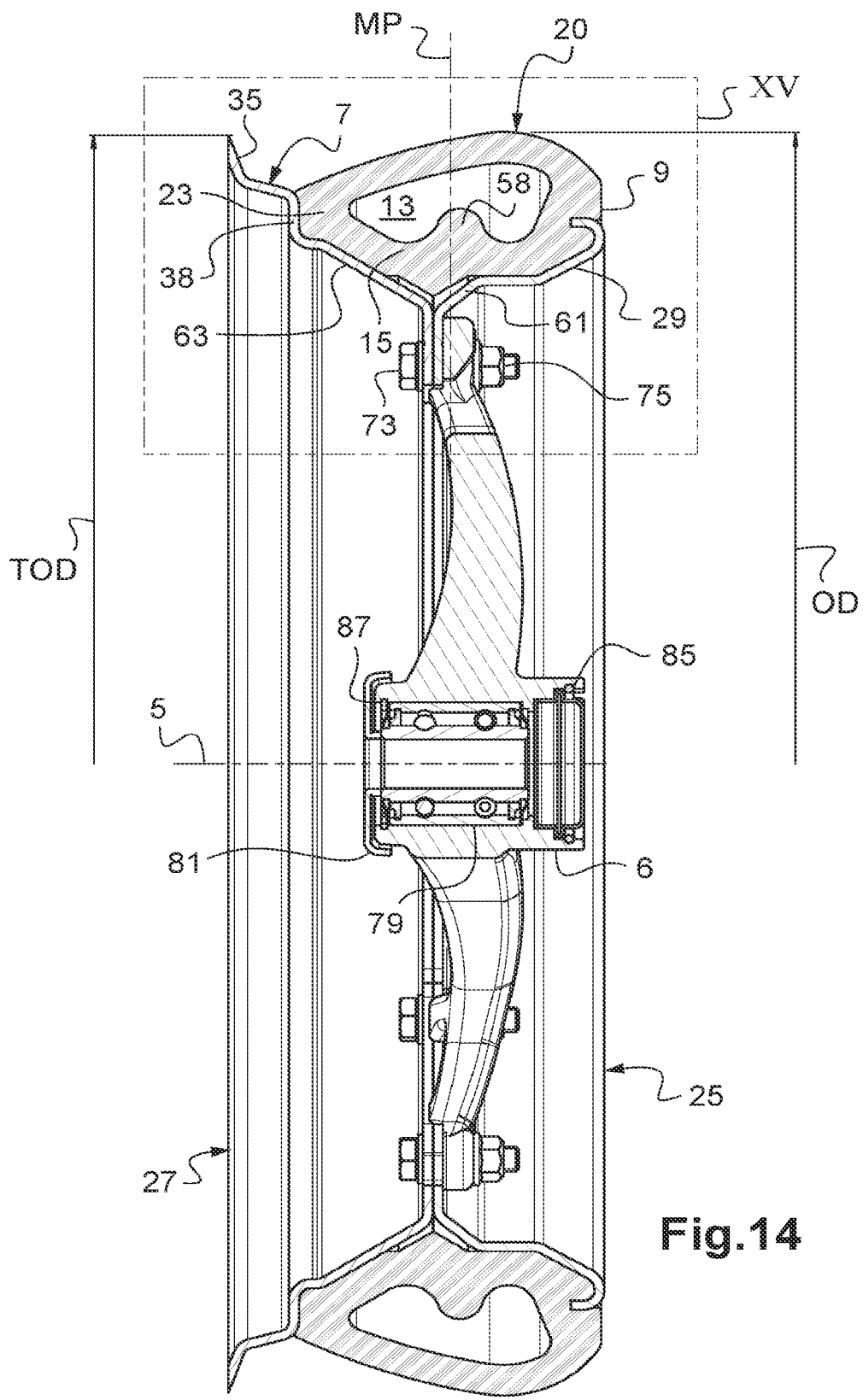
Figure 15:
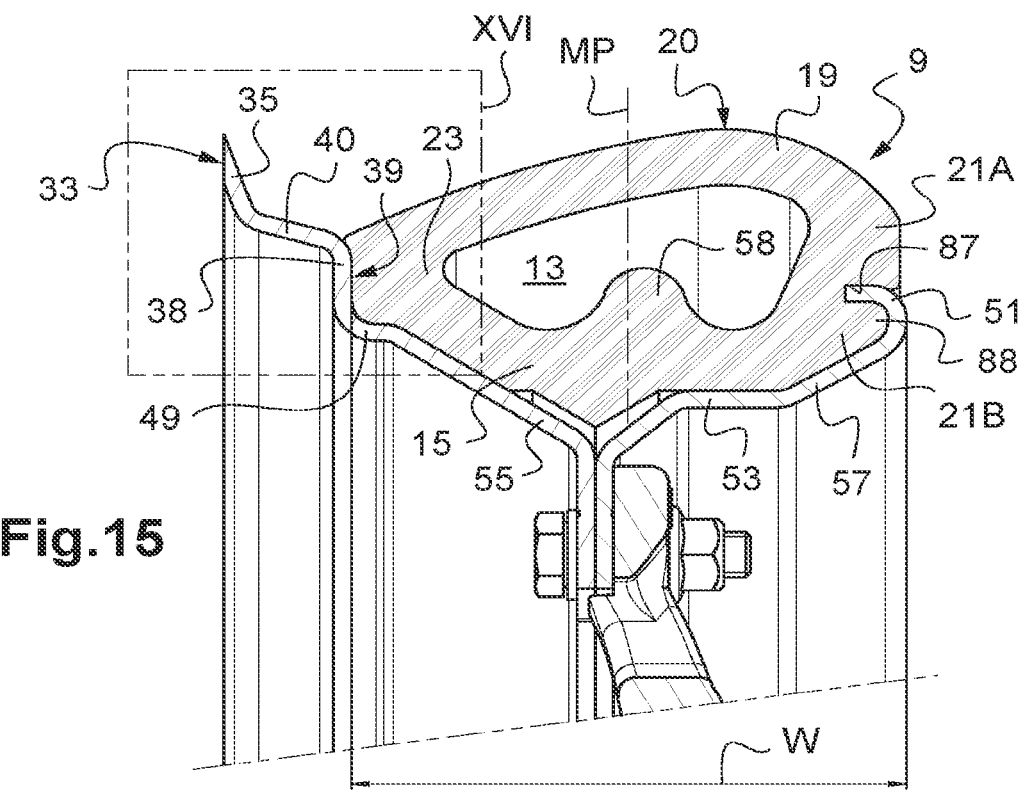
Figure 16:
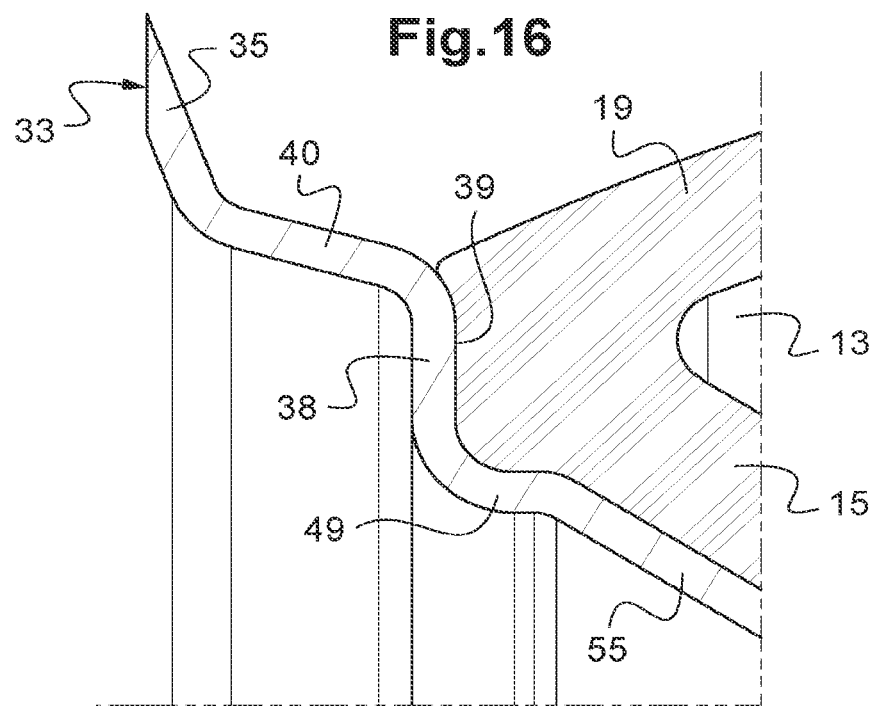
Figure 17:
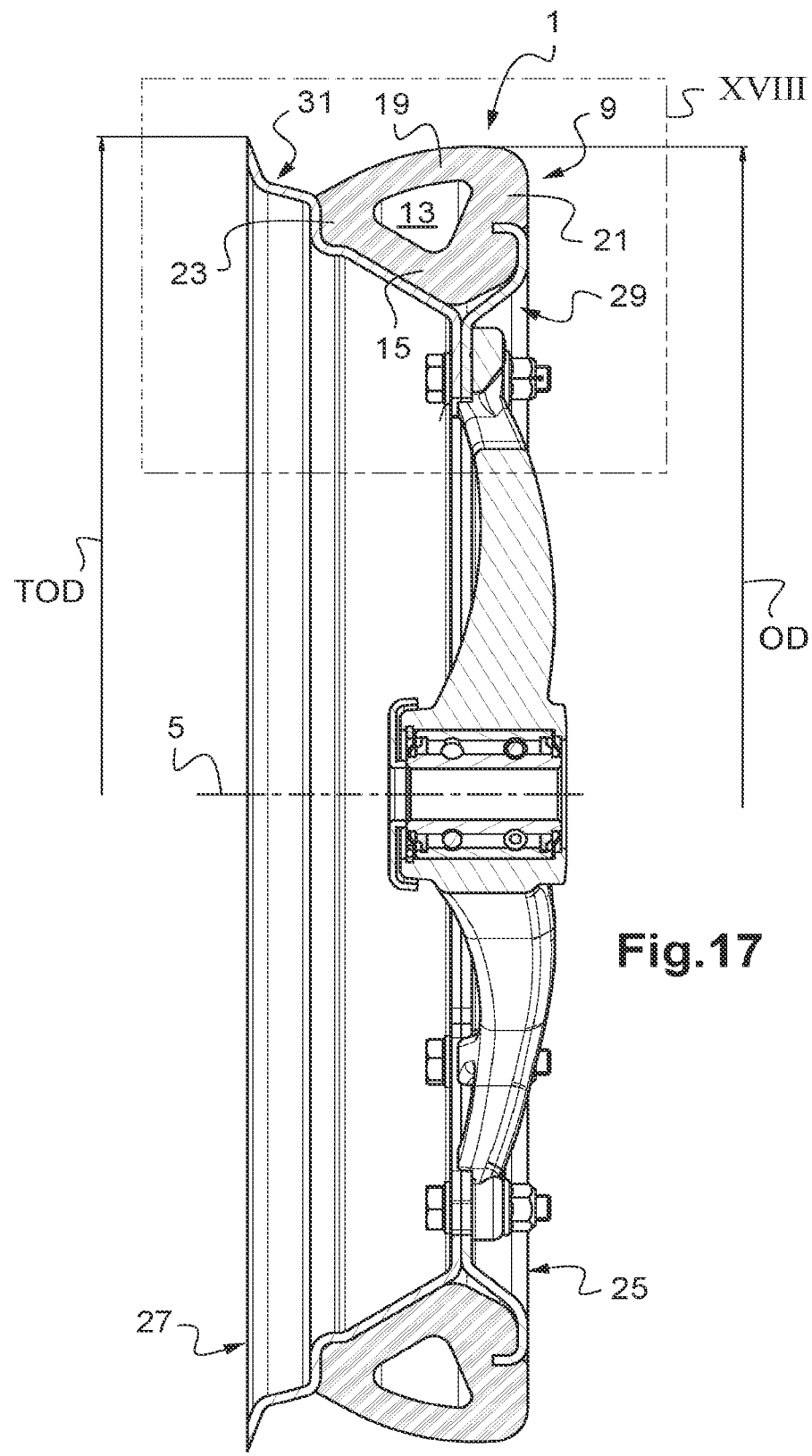
Figure 18:
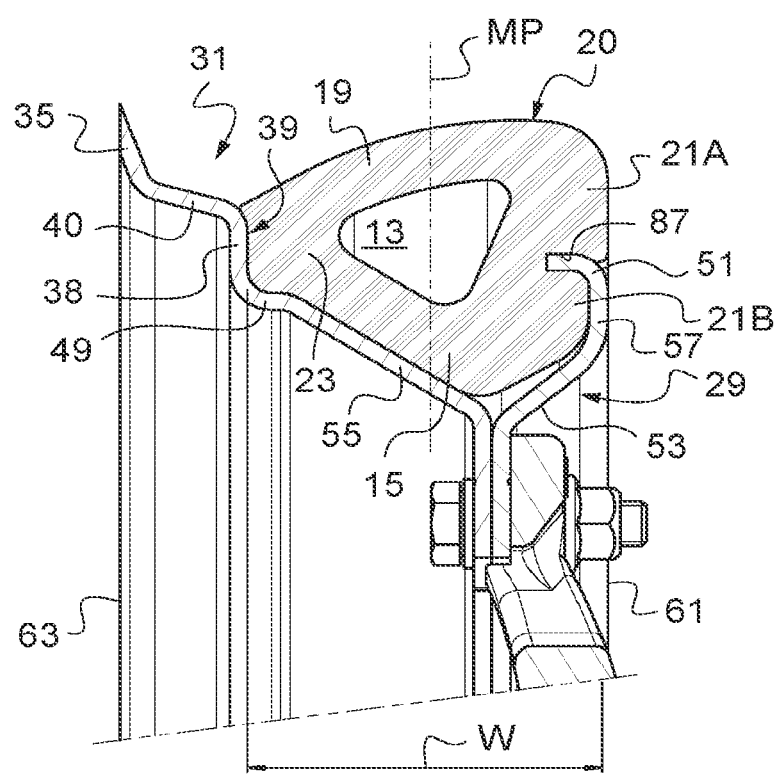
Figure 19:
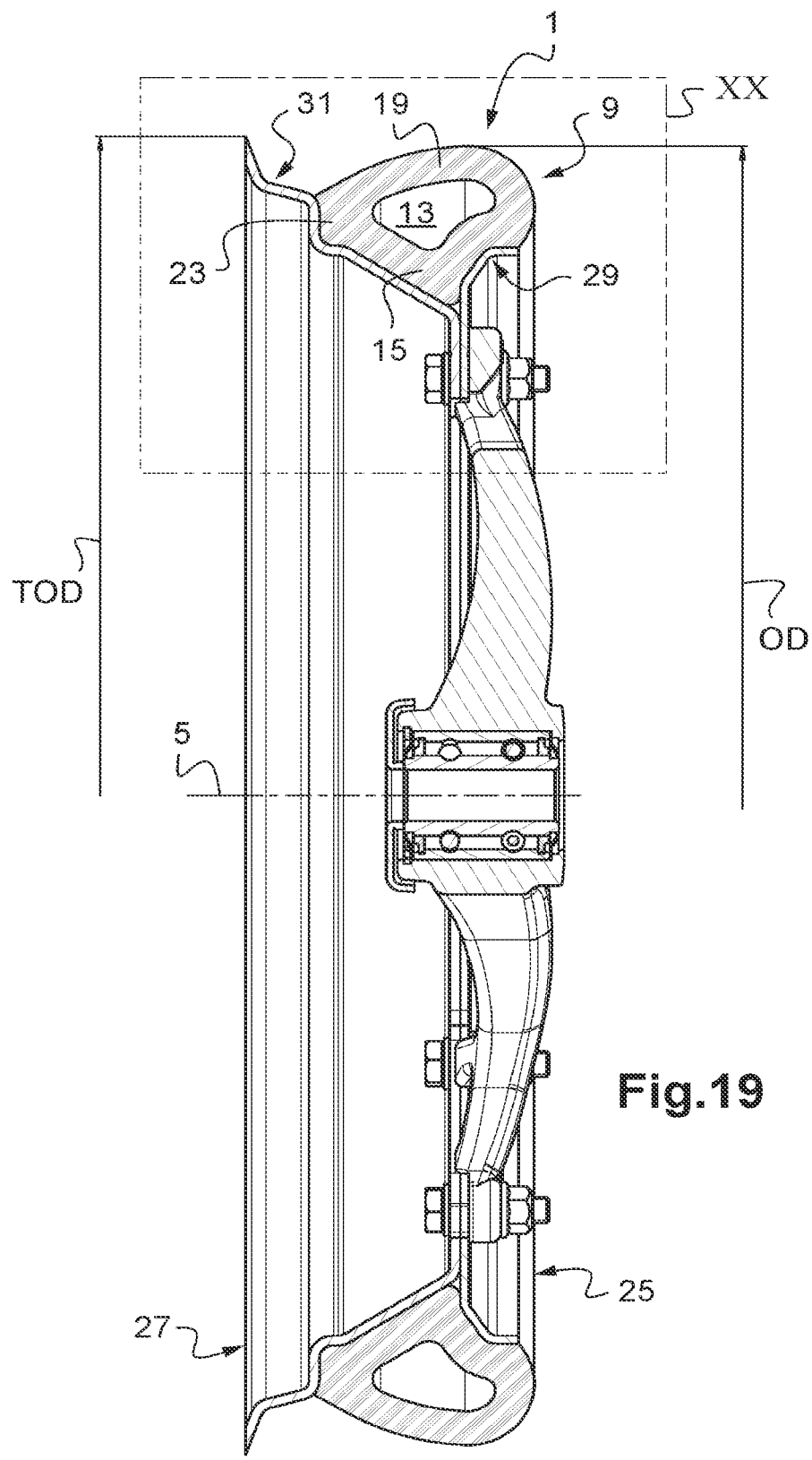
Figure 20:
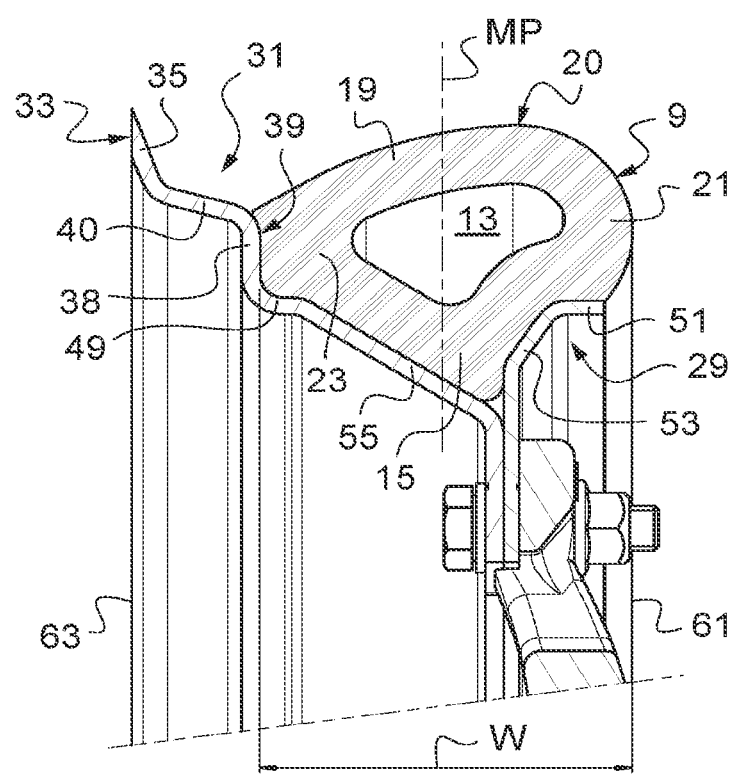

Other features and advantages of the invention will become apparent upon reading the detailed description below, made in relation to the drawings, wherein:

FIG. 1 shows a seed drill module, seen from the front;
FIG. 2 shows the module of FIG. 1, seen from the left;
FIG. 3 shows the module of FIG. 1, seen from behind;
FIG. 4 shows the module of FIG. 1, seen in isometric perspective;
FIG. 5 shows an accessory wheel according to a first embodiment, seen from the front;
FIG. 6 shows the wheel of FIG. 5, in section along a line VI-VI;
FIG. 7 shows the wheel of FIGS. 5 and 6, in isometric perspective;
FIG. 8 shows the wheel of FIGS. 5 to 7 exploded;
FIG. 9 shows a detail IX of FIG. 6;
FIG. 10 shows a detail X of FIG. 9;
FIG. 11 is equivalent to FIG. 6 for a variant of the first embodiment;
FIG. 12 shows a detail XII of FIG. 11;
FIG. 13 shows a detail XIII of FIG. 12;
FIG. 14 is equivalent to FIG. 6 for another variant of the first embodiment;
FIG. 15 shows a detail XV of FIG. 14;
FIG. 16 shows a detail XVI of FIG. 15;
FIG. 17 is equivalent to FIG. 6 for a second embodiment of the accessory wheel;
FIG. 18 shows a detail XVIII of FIG. 17;
FIG. 19 is equivalent to FIG. 6 for a variant of the second embodiment;
FIG. 20 shows a detail XX of FIG. 19;

The drawings and the description below essentially contain elements that are certain. They can therefore not only be used to better understand the present invention, but also contribute to its definition, if necessary.

The term "wheel body" (or "body") refers here to the practically undeformable portion of a wheel, as opposed to its essentially deformable portion constituted by the tire or the pneumatic tire. The term "wheel rim" (or "rim") refers to the peripheral portion of the wheel body intended in particular to support the tire or the pneumatic tire. The rest of the wheel body can be called a "dish" ("disc", "wheel disc", or else "wheel dish"). The wheel body thus consists of the rim and the dish.

Unlike the use which is sometimes made of it, the term "rim" does not designate here the entire wheel body.

Reference is made to FIGS. 1 to 4.

A seed drill assembly 100 comprises a pair of similar rotary tools 101, mounted symmetrically relative to a vertical plane on a support. Each tool 101 comprises a respective seeding disc 105, mounted rotationally free on the frame of a machine or of a tool towed/pushed by such a machine, and a respective accessory wheel 107, mounted rotationally free around an axis 109, on an arm 103 which connects the wheel 107 to the frame in question. The disc 105 and the wheel 107 of a respective tool 101 are free to rotate relative to each other.

The arm 103, or at least a portion thereof adjacent to the wheel 107, is interposed between the disc 105 and the wheel 107.

In each tool 101, the axis of rotation 109 of the wheel 107 relative to the arm 103 is eccentric from the axis of rotation of the seeding disc 105. This eccentricity comprises a non-zero vertical component so that the axis of rotation of the disc 105 relative to the arm 103 is located lower than that of the wheel 107. The eccentricity in question further comprises a non-zero horizontal component so that the axis of rotation of the disc 105 relative to the arm 105 is at the front of that of the wheel 107, with reference to a direction of advance 111 of the assembly 100.

For its assembly, the disc 105 of each tool 101 comprises a hub (not shown) equipped with one or more bearings, of the rolling type in particular. This hub protrudes from the disc 105, or at least from one face of this disc 105 oriented towards the wheel 107 of the tool 101. This hub is located at least in part in a space of the wheel 107 comprised between two large lateral faces thereof.

Each wheel 107 comprises a body (not referenced) with a central portion forming a hub and a peripheral portion forming a rim. The rim is equipped with a semi-hollow tire 113, produced in the form of a deformable case. This case comprises a portion forming a tread by means of which the wheel 107 rests on the ground. The tire 5 is made of a flexible material of the rubber or elastomer type.

In a semi-hollow tire, the case delimits a space empty of material, like a chamber, maintained in fluid communication with the outside, most often by means of one or more holes through the case. The air pressure inside the chamber tends to correspond to atmospheric pressure. For this reason, a semi-hollow tire can also be described as non-inflatable and/or non-inflated. The term "pneumatic tire" is sometimes preferred to that of "tire" because a semi-hollow tire has a profile which may resemble what is conventionally called a "pneumatic tire".

The discs 105 of the assembly 100 are mounted on the arm 103 in an inclined manner relative to a vertical plane, with a first angular toe, and to the plane of symmetry, with a second angular toe. These discs 105 approach each other, on the one hand, in the direction of advance 111 and, on the other hand, in a vertically downward direction. The assembly 100 has a configuration called "V" configuration relative to the vertical direction and to the direction of advance 111. The first toe angle and/or the second toe angle are for example close to 5°. The first toe angle may differ from the second one.

The wheels 107 are oriented similarly to the discs 105. The first and second toe angles of the wheels 107 may differ from those of the discs 105.

When the assembly 100 is working, the discs 105 penetrate the ground so as to create a furrow therein, intended for example for the burying of grains or seeds, while the assembly 100 rests on the ground by means of the wheels 107, in particular the tread of the tire 113. The working depth of the discs 105 is fixed thanks to the wheels 107 and corresponds to the vertical offset of the axis of rotation 109 of the wheels 107 relative to that of the discs 105, i.e. to the vertical component of the eccentricity of these axes. The discs 105 can thus work the ground at a substantially constant depth, even when a field has unevenness.

The tire 113 has an annular lip 115, which radially and axially protrudes from the rest of the case outwardly of the tire 113 and from the rim of the wheel body.

When the assembly 100 advances, the lip 115 of each wheel 107 rubs against the proximal face of a neighboring disc 105 by scraping it. This scraping has the effect of cleaning the discs 105 of anything that may have adhered thereto, such as mud or debris for example.

The tire 113 of FIGS. 1 to 4 is of a known type, for example from FR 3 017 265 A1 in the name of the Applicant. Other forms of hollow lip tire are known, in particular from FR 2 885 008 A1.

For some applications, for example when the ground is composed of clayey and/or sticky soil, a lip of the type of the annular lip 115, made of flexible material, may not be fully satisfactory. The cleaning effect produced by such a lip may prove to be insufficient.

Reference is made to FIGS. 5 to 10.

These figures show a wheel 1 of a new type, suitable for replacing the accessory wheel 107 in the assembly 100 described in relation to FIGS. 1 to 4.

The wheel 1 comprises a wheel body 3 of a general shape of revolution, around a central axis which coincides with a central axis 5 of the wheel 1. The body 3 comprises a central portion shaped as a hub 6 and a peripheral portion shaped as a rim 7. The wheel 1 is equipped with a semi-hollow-type tire 9, which fits around the rim 7. The tire 9 comprises a flexible case of a generally toroidal shape, a central axis of which coincides with the central axis 5 of the wheel 1 when the tire 9 is mounted on the body 3. The case of the tire 9 defines a chamber 13. This chamber 13 is hollow and non-inflatable, typically due to the fact that one or more holes pass through the case of the tire 9 (not shown).

The tire 9 is made of a flexible material, of the elastomer type, preferably of natural or synthetic rubber, optionally mixed with one another. This material preferably has a Shore hardness comprised between 50 and 70. The case has a significant capacity to deform and resume its initial shape, due to the combination of a flexible material and a hollow interior space, such as the chamber 13, in fluid communication with the outside. The case is deformed in particular when the wheel 1 is working, biased by a reaction force from the ground. This force is exerted mainly radially towards the central axis 5 of the wheel 1.

The tire 9 includes a generally tubular inner sheath 15, shaped so as to fit closely on the outer surface of the rim 7, or at least over an axial portion thereof. The portion of the tire 9 corresponding to the sheath 15 is sometimes called the "sole". The sheath 15 corresponds to the radially inner portion of the tire 9. The sheath 15 carries an inner face 17 of the tire 9. This inner face 17 is generally oriented substantially radially towards the central axis of the tire 9. Essentially, the inner face 17 comprises surfaces oriented substantially radially towards the central axis of the tire 9 or the orientation of which comprises a radial component oriented towards this axis.

The tire 9 further includes a portion of the case radially opposite to the sheath 15 and which forms a tread 19. The tread 19 corresponds to a radially outer face of the tire 9, i.e. essentially oriented radially opposite to the central axis of the tire 9.

The tread 19 is connected to the sheath 15 by two portions of the case which are axially opposite to each other and which form the sidewalls of the tire 9: an outer sidewall 21, on the right of the chamber 13 in FIG. 6, and an inner sidewall 23, on the left.

The outer sidewall 21 and the inner sidewall 23 extend generally in the radial direction of the tire 9. Alternatively, at least one of the outer sidewall 21 and the inner sidewall 23 generally extends in a direction slightly inclined relative to the radial direction, of the order of a few degrees and 15 degrees at most.

This inclination can be positive, when the sidewall is spaced from the radial direction axially outwardly of the tire 9 as it moves away from the axis of the tire 9, or negative, when this spacing is in the direction axially inwardly of the tire 9.

For the inner sidewall 23 at least, a negative inclination relative to the radial direction is favored over a positive inclination, in that a negative inclination is accompanied by more effective sealing and preserves the inner sidewall 23 from weakening.

The tread 19 has a profile which is generally domed towards the outside of the tire 9 (convex), continuously from the outer sidewall 21 to the inner sidewall 23. This profile has a top portion 20, the distance from the central axis of the tire 9 of which corresponds to a half outside diameter OD of this tire 9. Here, for example, the diameter OD is close to 405 millimeters. This top 20 is located here in a median plane MP of the tire 9, or close thereto. The plane MP of the tire 9 is perpendicular to the central axis of this tire 9 and is located axially at an equal distance from the outer sidewall 21 and the inner sidewall 23. The spacing between these sidewalls, i.e. the distance separating their respective outer surface in the axial direction, corresponds to a width W of the tire 9.

When a force is exerted on the tread 19 which is essentially directed radially towards the central axis of this tire 9, the case of the tire 9 tends to deform in such a way that the outer sidewall 21 and the inner sidewall 23 are each biased axially towards the outside of the tire 9. Such a force typically results from the reaction of the ground when the wheel 1 is working. The domed shape of the tread 19 causes the force exerted on this tread 19 to bear on the outer sidewall 21 and the inner sidewall 23 with an axial resultant. The outer sidewall 21 and the inner sidewall 23 are biased in an approximately similar manner to each other due to the symmetry of the tread 19.

Here, the outer sidewall 21 is substantially thicker than the inner sidewall 23. This allows to increase the resistance of the outer sidewall 21, in particular to wear, relative to the inner sidewall 23. In work, the outer sidewall 21 is more exposed that the inner sidewall 23. Furthermore, this wheel 1 is intended to work at a cross angle relative to the direction of advance, which angle exposes the outer sidewall 21. This extra thickness can reach 20 percent.

For example, a thickness of the inner sidewall 23 may be comprised between 8 and 12 millimeters while the thickness of the outer sidewall 21 may be comprised between 8 and 15 millimeters.

The outer sidewall 21 and the inner sidewall 23 have outer diameters which are close to each other.

The body 3 has a first large face, or front face 25, on the right in FIG. 6, and a second large face, or rear face 27, on the left, opposite to the front face 25.

The wheel 1 is intended to be mounted in an agricultural tool, for example of the type of the assembly 100 described in relation to FIGS. 1 to 4, so that the rear face 27 of the body 3 is located in part at least facing a tool in the shape of a disc, such as the disc 105 of FIGS. 1 to 4 for example. The front face 25 of the body 3 is then oriented opposite to this disc. This front face 25 of the body 3 is directed towards the outside of an assembly of the type of the assembly 100 of FIGS. 1 to 4, the rear face 27 towards the inside.

The rim 7 comprises a first axial section shaped as a seat 29 adapted to the sheath 15, or at least to the portion of this sheath 15 which corresponds to the inner face 17 of the tire 9. This seat 29 has a shape which essentially corresponds to the inner face 17 of the tire 9. The tire 9 is held on the rim 7 by means of a bearing of its inner face 17 against the seat 29, over most of the axial extent of this face 17.

The seat 29 is generally oriented substantially radially towards the outside of the body 3, or its orientation comprises a radial component oriented towards the outside of the body 3, optionally in portions in the axial direction of the body 3. The seat 29 includes mostly surfaces oriented substantially radially towards the outside of the body 3, or the orientation of which comprises a radial component oriented towards the outside of the body 3. When the tire 9 is mounted on the body 3, its inner face 17 is in contact, for its greater part at least, with the seat 29. Here, the seat 29 ends axially on the front face 25 of the body 3. The seat 29 receives the radially inner portion of the tire 9, which extends from the inner sidewall 23 to the outer sidewall 21.

The rim 7 further comprises a second axial section shaped as a scraper tool 31 and which extends axially from the rear face 27 of the body 3. The scraper tool 31 comprises an end surface 33 in the shape of a crown, which extends radially and by means of which the tool 31 is intended to rub against the disc of a seed drill, typically the disc 105 described in relation to FIGS. 1 to 4. This end surface 33 is carried by a section of the tool 31 shaped as a ledge of the rim 7, or inner ledge 35. The inner ledge 35 is generally frusto-conical and widens radially, in the direction of the end surface 33.

The inner ledge 35 ends in a sharp ridge 37, which forms the outer edge of the crown 33. The ridge 37 is intended to scrape the surface of a seeding disc, for example of the type of the disc 105 of FIGS. 1 to 4. The end surface 33 can be seen as a relief surface relative to the ridge 37. A radially outer surface of the inner ledge 35 can be seen as a scraping surface, as the soil which is detached from the disc by the action of the ridge 37 tends to follow this surface of the inner ledge 35.

The distance from the ridge 37 to the axis 5 in the radial direction of the body 3 corresponds to half of the outside diameter TOD of the tool 31. For example, the diameter TOD can reach 410 millimeters.

The distance which separates, in the axial direction of the body 3, the crown 33 from an end remote from the additional section 40 corresponds to a width TW of the tool 31. For example, the width TW can reach approximately 20 millimeters.

As shown in the figures, the inner ledge 35 is inclined at an angle A35 of about 20 degrees relative to the radial direction of the body 3. Other values of inclination can be considered. An inclination comprised between 10 and 45 degrees is beneficial in the evacuation of soil, or the like, detached from the disc with which the wheel 1 cooperates.

The rim 7 further comprises an intervening axial section 38, which connects the section carrying the seat 29 to that forming the tool 31. This intervening section 38 is shaped so as to carry a bearing surface 39 adapted to the inner sidewall 23 of the tire 9. This bearing surface 39 forms an axial stop on the body 3 against which the tire 9 is mounted. The bearing surface 39 is shaped to be form fitted with the inner sidewall 23, or at least the outer surface thereof. This bearing surface 39 cooperates with the inner sidewall 23 over the entire extent of the latter. The radial extent of the bearing surface 39 and that of the inner sidewall 23 are close to each other. The bearing surface 39 does not project radially from the inner sidewall 23. This inner sidewall 23 does not project radially from the bearing surface 39. The bearing surface 39 extends over the entire intervening section 38 of the rim 7. An optimal cooperation is thus obtained between the bearing surface 39 and the inner sidewall 23.

The bearing surface 39 could extend radially outwardly of the body 3 beyond the inner sidewall 23. However, this would result in an area between the rim 7 and the tire 9 where the latter would be unlikely to deform and where, as a result, debris or soil could accumulate. With a bearing surface 39 and an inner sidewall 23 of similar heights, any accumulation of soil or the like is avoided at the junction of the tool 31 to the tread 19 of the tire 9.

A connection is obtained between the tool 31 and the tire 9 widely open to the outside and rather fluid in shape. This prevents the fouling of this connection and reduces the impact of the wheel 1 on the field, near the furrow.

The bearing surface 39 begins radially where the sheath 15 connects to the inner sidewall 23. The bearing surface 39 ends radially where this inner sidewall 23 connects to the tread 19.

The tool 31 further comprises an axial section of the rim 7 which connects the ledge 35 to the intermediate section 38, or additional section 40. This additional section 40 is generally frusto-conical. The inclination of the additional section 40 relative to the direction which is radially opposite the axis 5 is much greater than that of the ledge 35.

The inclination of the additional section 40 is identified by the angle A40 made by this additional section 40 with the axial direction. This inclination allows to prevent the accumulation of soil on the tool 31.

An additional frusto-conical section 40 tends to be cleaned better than a cylindrical section. An inclination of this additional section 40 greater than that of the ledge 35 is beneficial. Such an inclination gives the region of the wheel 1 comprised between the ledge 35 and the tread 19 a configuration which is radially open outwards (concave). Such an opening thwarts the accumulation of soil in this region. The angle A40 is comprised between 10 and 45 degrees is preferred here. Such an inclination provides, on the one hand, a clear break in profile between the ledge 35 and the intermediate section 40 and a fluidity of the profile of the region grouping the tread 19 and this intermediate section 40. Here, this inclination is close to 30 degrees.

The ledge 35 and the additional section 40 form therebetween an angle A354 greater than 90 degrees. Here, the angle A354 between the extension of the ledge 35 and that of the additional section 40 is comprised between 100 and 120 degrees. Such an angle promotes the evacuation of the soil detached from the disc.

This association, in the tool 31, of two frusto-conical sections of different inclinations improves the performance of the wheel 1. It allows to separate, in the tool 31, the portion involved in the scraping of the disc and the portion in contact with the ground. This association increases the rigidity of the tool 31 and consequently its efficiency. A configuration of the tool 31 in a single frusto-conical surface is however not excluded. This configuration would result, all other things being equal, in a greater inclination of the ledge 35 relative to the radial direction. A configuration of the tool 31 in three or more frusto-conical surfaces complicates its manufacture and tends to create a stepped profile that is less efficient for the evacuation of the soil and more damaging to the ground. Above all, such a profile is accompanied by an axial bulk of the tool 31 which makes it impractical. The ledge 35 and the additional section 40 here have a rectilinear profile. Without departing from a general frusto-conical shape, the ledge 35 and the additional section 40 could have a slightly curved, in particular concave profile.

The inclination of this additional section 40, relative to the axial direction for example, can be close to that of the tread 19, at least in the vicinity of the connection of this tread 19 to the inner sidewall 23. Here, it is about imparting to the corresponding portion of the wheel 1 a valley shape which is useful from an agronomic point of view. Indeed, the portion in question is in contact with the ground when the tool is working. Preferably, the angle A419 formed between the direction of extension of the additional section 40 and the tread 19, at least in the vicinity of the inner sidewall 23, is greater than 100 degrees, while remaining less than 150 degrees.

The rim 7 consists of an axial section shaped as a tool 31, an axial section shaped as a seat 29 for the tire 9 and an intervening axial section 38 which connects the tool 31 to the seat 29. This intervening section 38 forms an axial stop 39 against which the tire 9 rests as soon as it is assembled. The tool 31 consists of an axial section shaped as a ledge 35 and an additional section which forms an open angle on the outside of the wheel 1.

Unlike conventional pneumatic tires, in particular those described in the aforementioned publications, the tire 9 has no lip, in particular where the tread 19 is connected to the inner sidewall 23. The tread 19 can be connected to the inner sidewall 23 in a sharp ridge or a rounding, which mark a break in the directions of the outer surfaces of these portions of the case.

Here, this connection is shaped as a bead 41. This bead 41 is formed by a slight inflection of the curvature of the tread 19 in the vicinity of the end of the latter which is connected to the inner sidewall 23 and by a portion the profile of which forms a slight rounding at the end of the inner sidewall 23.

The bead 41 projects substantially from the rest of the outer surface of the inner sidewall 23, the profile of which is rectilinear and extends purely radially. This projection is very limited: of the order of 5 millimeters at most.

The bearing surface 39 is connected to the tool 31 by a portion of the rim 7 shaped as a rounding 43. The bearing surface 39 is connected to the seat 29 by a rim portion 7 whose profile forms a fillet 45.

The tire 9 has a rounded edge 47 where the sheath 15 is connected to the inner sidewall 23. This rounded edge 47 is arranged form fitted with the fillet 45 between the seat 29 and the bearing surface 39. The rounding of the bead 41 is form fitted with the rounding 43 of the rim 7. This improves the cooperation between the inner sidewall 23 and the intervening section 38 of the rim.

The bearing surface 39 generally extends in an essentially radial direction. The direction of extension of this bearing surface 39 may have an axial component. However, this axial component remains low with regard to the radial extension of the bearing surface 39. The inclination of this bearing surface 39 relative to the radial direction is less than approximately 15 degrees.

The inner face 17 of the tire 9 is shaped so as to bear against axial sections of the rim 7 provided with surfaces forming support surfaces which are generally cylindrical and centered on the axis 5.

These cylindrical support surfaces here comprise the outer surface of a first end section of the seat 29, close to the inside of the rim 7, or inner edge 49 of the seat 29, and the outer surface of a second end section of the seat 29 which forms its outer edge 51 and that of the rim 7. The cylindrical support surfaces also comprise the outer surface of an intermediate section 53 of the seat 29, located on the outer side of the body 3. These support surfaces respectively cooperate with surfaces with a shape complementary to the inner face 17 of the tire 9, located respectively in line with the inner sidewall 23, the outer sidewall 21 and a portion of the sheath 15 located on the outer side of the plane MP.

The inner edge 49 of the seat 29 is connected to the intervening section 38. The outer edge 51 of this seat 29 ends up on the front face 25 of the body 3. Sections which are equivalent to the inner edge 49 and to the outer edge 51 are generally referred to as "rim edges" in a conventional wheel body, without a section similar to the tool 31.

The sheath 15 and the rim 7 are here shaped so as to jointly produce a generally frusto-conical support surface, which widens axially towards the inner face of the wheel 1. This frusto-conical support surface corresponds to a frusto-conical section 55 of the rim 7, section which is connected to the intervening section 38. This frusto-conical section 55 is located on the side of the tool 31 relative to the plane MP. This frusto-conical support surface contributes to blocking the tire 9 against the bearing surface 39. This frusto-conical section 55 further facilitates the mounting of the tire 9 on the body 3, around the seat 29. This frusto-conical section 55 facilitates the slipping of the sheath 15 around this portion of the rim 7, while the bearing surface 39 provides a stop during this slipping. This frusto-conical section 55 further frees up a space inside the body 3 (dish) larger than a portion with a shape similar to the intermediate section 53 would, for example. This space is freed up where the hub of a seed drill disc usually protrudes, or at least close thereto.

The portion of the seat 29 between its inner edge 49 and its outer edge 51 comprises a seat bottom. This seat bottom comprises the intermediate section 53 on one side of the plane MP and the frusto-conical section 55 on the other side.

The outer edge 51 of the seat 29 and the intermediate section 53 of the latter connect to one another via a section of the rim 7, or connection section 57, which extends substantially radially or in a slightly inclined manner relative to this radial direction. This connection section 57 further provides a stop surface when slipping the tire 9 around the body 3. The connection section 57 further carries an axial bearing surface for the tire 9, additional to the bearing surface 39. Unlike the bearing surface 39, this additional bearing surface carried by the connection section 57 acts on the portion of the tire 9 corresponding to the sheath 15. The connection section connects the seat bottom 29 to the outer edge 51 of this seat.

The rim 7 is formed in one or more parts produced here by stamping or rolling a sheet metal portion. The rim 7 has a shape of revolution around the axis 5, with a generally tubular shape and of substantially constant thickness over all the axial sections of the rim 7, from the inner ledge 35 to the outer edge 51.

The tire 9 is mounted on the body 3 in an axially stressed state, between the surface 39 and the connection surface 57. When the tire 9 is not mounted on the rim 7, the spacing from the surface of the inner sidewall 23 which cooperates with the bearing surface 39 of the rim 7 and that of the sheath 15 which cooperates with the connection section 57 in the axial direction is greater than the spacing in the axial direction of the surfaces of the rim 7 which cooperates therewith. A compression comprised between 2 and 5 percent of the axial extension of the tire 9 is generally applied. For example, the axial extension of the tire 9 when mounted on the seat is 2 to 3 millimeters less for a tire 9 of the order of 100 millimeters wide.

A sealing is produced to prevent the soil detached by the tool 31 or that of the ground where the tool 31 rolls from being inserted between the seat 29 and the tire 9 when the wheel 1 is working. This sealing is achieved between the tool 31 and the seat 29, exclusively by pressing the bearing of the inner sidewall 23 against the bearing surface 39. This bearing is implemented when mounting the tire 9, due to the axially stressed state of this tire 9. This bearing is maintained and increased during the work of the wheel 1 due to the axially outward bias of the inner sidewall 23.

The sheath 15 has a portion which protrudes radially into the chamber 13 at a stop 58 adapted to the tread 19. Here, this stop 58 is located axially in line with the top 20 of the tread 19. The height of this stop 58 is such that the crushing of the tread 19 is limited so as to avoid a bias directed radially towards the inside of the sidewalls. The height of the stop 58 is such that the tread 19 cannot cross a virtual line VL connecting the places of connection of the inner sidewall 23 and the outer sidewall 21 to the tread 19 (neutral fiber). Alternatively, the stop 58 can protrude from the tread 19 radially towards the axis 5. Further alternatively, the stop 58 can be made in two portions, one protruding radially from the tread 19, the other from the sheath 15. For an equal stroke, a stop 58 in two portions allows to reduce the extension of each of these portions and thus improve the manufacture of the tire 9, in particular its curing (vulcanization).

The height of the stop 58 is close, by greater values, to the height of the inner sidewall 23. When the stop 58 is partially produced, their cumulative height is close, by higher values, to the height of the inner sidewall 23.

This stop 58 finds its full utility in the embodiment described here, where the thickness of the considered case and the hardness of the material thereof make this case very deformable and cleaning. In other embodiments, a harder material, for example with a hardness comprised between 75 and 80 Shore, combined with a greater thickness means that the tire 9 hardly deforms during work. In this hypothesis, the stop 58 could be omitted.

The stop 58 extends more substantially in the direction of the inner sidewall 23 than in the direction of the outer sidewall 21 in order to ensure that the inner sidewall 23 is not biased axially inwards as a result of the deformation of the tread 19.

The stop 58 further acts as a stiffener for the sheath 15 and thus helps to hold the tire 9 around the seat 7. The stop 58 surrounds the sheath 15 around the rim 7. This further helps to prevent any movement of the tire 9 relative to the body 3 in the axial direction.

Here, the sheath 15 has a circular rib 59 which protrudes from the inner face 17 of the tire 9. The rib 59 is located substantially in line with the stop 58, between a portion of the sheath 15 which is against the support surface of the frusto-conical section 55 and the support surface of the intermediate section 53. This rib 59 rigidifies the sheath 15 and thus contributes to maintaining the axial position of the tire 9 relative to the seat 29.

The seat 29 extends between its inner edge 49 and its outer edge 51, here each supporting a cylindrical support surface. Between the inner edge 49 and the outer edge 51, the rim 7 has a general bowl profile. The continuous axial section of the rim 7, the outer surface of which carries a regular surface at least partly in contact with the sheath 15 of the tire 9, is called seat. The frusto-conical section 55 could be connected directly to the intervening section 38 and the seat 29 has no cylindrical support surface 49 in the vicinity of this intervening section 38.

The body 3 is here formed of a first flange, or outer flange 61, and of a second flange, or inner flange 63, mounted on top of each other and held together fixedly to form the wheel body 3.

The outer flange 61 and the inner flange 63 each have a shape of revolution about a respective central axis. These central axes coincide with the axis 5 when the outer flange 61 and the inner flange 63 are assembled in the body 3.

The outer flange 61 has a first large face, or inner face 65 by means of which the outer flange bears against the inner flange 63. The inner flange 63 has a first large face, or outer face 67, by means of which the inner flange contacts the outer flange 61. The outer flange 61 and the inner flange 63 each have a second large face, respectively outer face 69 and inner face 71, opposite to the inner face 65 of the outer flange 61 and the outer face 67 of the inner flange 63.

The outer flange 61 has a peripheral portion which connects its inner face 65 to its outer face 69. The inner flange 63 has a peripheral portion which connects its inner face 71 to its outer face 67. The peripheral portion of the outer flange 61 corresponds to an axial portion of the seat 29, while the peripheral portion of the inner flange 63 corresponds to the remaining section of the seat 29, to the tool 31 and the junction portion 39 between the seat 29 and the tool 31.

The outer flange 61 and the inner flange 63 each have a central portion, which is connected to their respective peripheral portion. These central portions comprise a crown surface, 62 for the outer flange 61 and 64 for the inner flange 63, by means of which these flanges are bearing against one another. For the rest, the central portion of the outer flange 61 and of the inner flange 63 is largely hollowed out. The outer flange 61 and the inner flange 63 each have a substantially hollow dish. This dish could alternatively be full or receive a part closing it.

The outer flange 61 and the inner flange 63 are fastened here reversibly to each other by means of fasteners. In the example described here, these fasteners comprise screw 73 and nut 75 pairs. These screw 73 and nut 75 pairs are distributed in pairs along the periphery of the wheel body. Alternatively or in additionally, other fastening means can be used, for example, clips or rivets.

The body 3 includes arms 77, here three in number, each of which connects the hub 6 to the rim 7. The arms 77 and the hub 6 are integral. The arms 77 and the hub 6 are attached to the outer flange 61, here by means of screw 73 and nut 75 pairs.

In the illustrated embodiment, the body 3 consists of three elementary parts: the outer flange 61, the inner flange 61 and the assembly formed of the arms 77 and of the hub 6. This assembly can be seen as the dish of the wheel 1.

The hub 6 has a general shape of revolution. This hub 6 is suitable for receiving an axle or a spindle in order to support the wheel 1 in rotation, in a loose manner, typically on an arm of the type of the arm 102 described in relation to FIGS. 1 to 4.

The wheel 1 comprises a rotary bearing 79 housed in the hub 6, here in the form of a two-row ball bearing. Alternatively, the bearing 79 may take the shape of one or more rollers of a different type or of a plain bearing.

The hub 6 has a bore 80 suitable for housing the bearing 79. The bearing 79 is held therein axially in a conventional manner, for example, on one side by a stop formed in the bore 80 and an elastic ring 81 on the other side. The bore 80 is through. On one side, the bore 80 is partially closed for a cup 82 in the form of a crown, capable of allowing passage of the axis or the spindle. On the other side, the bore 80 is completely closed with a plug 83, held in place by an elastic ring 85.

In the examples described here, the inner flange 63 and the outer flange 61 are each formed from a respective one-piece part.

The bulk, or width, of the wheel 1 is here comprised between 110 and 114 millimeters, for example 112 millimeters. This width corresponds to the sum of the width TW of the tool 31 and the width W of the tire 9. Here, for example, the width W is close to 92 millimeters.

Reference is made to FIGS. 11 to 13.

The wheel 1 differs from the wheel 1 described in relation to FIGS. 11 to 13 by the shaping of the section of the seat 29 carried by the outer flange 61 and that of the tire 9 in the portion of the sheath 15 which rests on this seat 29 section.

The outer edge 51 of the rim 7 is curved, radially opposite the axis 5 and axially towards the inside of the body 3, so as to form a collar. In the vicinity of its end, the outer edge 51 of the rim 7 engages into a circular groove 87 made in the outer sidewall 23 of the tire 9. The section of this groove 87 corresponds to that of the outer edge 51 of the rim 7.

The groove 87 separates the outer sidewalls 21 into a portion which is radially remote from the axis 5, or high portion 21A, and a portion which is radially close to the axis 5, or low portion 21B. The high portion 21A of the outer sidewall 21 is shaped in a manner similar to its equivalent portion in the tire 9 of FIGS. 5 to 10. The low portion 21B of the outer sidewall 21 is shaped in a complementary manner to the collar of the outer edge 51. This low portion 21B bears by its outer surface against the inside of the collar.

The collar formed as a ledge of the rim 7 improves the holding of the tire 9 on the rim 7, in particular in the axial position and in the stressed state. By reaction of the case of the tire 9 to a reaction force from the ground, the contact pressure between the inner sidewall 23 and the bearing surface 39 is increased. The collar improves the sealing between the tire 9 and the bearing surface 39. In the vicinity of the opening of the groove 87, the tire 9 is shaped as a bead 88 adapted to bear against a portion of the collar of the outer edge 51.

Between the support surface corresponding to the intermediate section 53 of the rim 7 and the outer edge 51 of the rim 7, the seat 29 here has a frusto-conical connection section 57. This frusto-conical shape further improves the bias on the case so as to push the inner 23 and outer 21 sidewalls axially outwardly of the tire 9. This shape also facilitates the mounting of the tire 9 on the body 3 around the rim 7. The inner face 17 of the tire 9 is shaped correspondingly to ensure a tire 9 to rim 7 contact on practically the entire seat 29, with the exception only of the circular rib 59.

Here, as in the variant of FIGS. 5 to 10, the sheath 15 is in contact with the seat 29 of the rim 7 over its entire extent, with the exception of the rib 59.

Reference is made to FIGS. 14 to 16.

In this variant, the wheel 1 differs from the wheel 1 described in relation to FIGS. 11 to 13 by the configuration of the tire 9.

Here, the top 20 of the tread 19 is offset from the median plane MP of the tire 9, axially towards the outer sidewall 23. This offset preserves the tread from soil comprised between the furrow and the top 20. It facilitates the closing of the furrow by avoiding to compact the soil therein. This top 20 is located substantially at the portion of the sheath 15 bearing against the cylindrical support surface of the intermediate section 53. The tread 19 has an asymmetrical shape from the inner sidewall 23 to the outer sidewall 21. The diameter OD of the tire 9 is greater than that of the embodiments of FIGS. 5 to 13, for example 412 millimeters. The tire 9 projects radially from the tool 31. The tread 19 is less inclined than in the previous embodiments relative to the axial direction.

The stop 58 is also axially offset towards the outer sidewall 21. This offset is adjusted so as to prevent the tread 9, during work, from crossing the virtual line VL.

The outer sidewall 21 has a thickness greater than that of its equivalent in FIGS. 11 to 13. This extra thickness results from an enlargement of the outer sidewall 21 towards the chamber 13, in a regular manner from the tread 19 to the sheath 15.

Reference is made to FIGS. 17 and 18.

In this second embodiment, the wheel 1 is significantly narrower. For example, the width W is here comprised between 40 and 60 millimeters, or approximately half the width W of the first embodiment. The width of the wheel is for example comprised between 78 and 82 millimeters, typically 80 millimeters. A wheel of this type finds its advantage in use in close-row seed drills, known in the art by the term "twin row" seed drills. A wheel of this type is also useful in the case of seed drill elements disposed closer to each other than in the case of FIGS. 1 to 4 in particular.

The outer edge 51 of the rim 7 is curved as in the embodiment of FIGS. 11 to 16. The connection portion 57 is more extended and here cooperates with the low portion 21B of the outer sidewall 21. This connection portion 57 extends practically radially. The intermediate portion 53 is frusto-conical and is connected directly to the crown 62 of the outer flange 61. The axial section of the rim 7 corresponding to this outer flange 61 has no cylindrical support surface. The top 20 of the tread 9 is located axially in line with the outer sidewalls 23. This outer sidewall 23 has the same shape as in FIGS. 14 to 16.

Reference is made to FIGS. 19 and 20.

In this variant, the outer sidewall 21 is generally domed towards the outside of the tire 9. This domed shape continues that of the tread 19. There is an outer edge 51 of the rim 7 shaped in a cylindrical support surface. The intermediate section 53 is frusto-conical. It provides a surface extending with an axial component capable of axially blocking the tire 9. The low portion 21B of the outer sidewall 21 generally follows this shape so as to have a thickness close to that of its high portion 21A which is domed. The inner face 17 of the tire 9 is form fitted with the seat. This axial stop improves the distribution of the force exerted on the top 20. This force is transmitted to the inner sidewall 23 furthermore through the outer sidewall 21 and the sheath 15. The width of the wheel is for example comprised between 80 and 84 millimeters, typically 82 millimeters A hollow dish body 3 has just been described. The body 3 could be a solid dish body. In particular, the body 3 described here can be transformed into a solid dish body by replacing the arms 77 with a sheet metal plate.

An outer sidewall 21 and an inner sidewall 23 which extend in a similar manner from one another, were described. The outer sidewall 21 and the inner sidewall 23 could extend at different inclinations from one another.

An intervening section 38 carrying an axial stop surface 39 form fitted with the inner sidewall 23 of the tire 9, or at least the outer surface of this sidewall 23, was described. Without departing from their shape complementarity, nor from their extension which is generally annular, the inner sidewall 23 and the axial stop 39, or the intervening section 38, could have a profile different from the rectilinear profile shown in FIGS. 5 to 20. For example, more complex profiles, for example lobe or wavy-shaped profiles, can be provided.

The invention claimed is:

1. An agricultural wheel forming an accessory for a seed drill disc, the wheel comprising:
   a body comprising a rim of a shape of revolution around a central axis;
   a semi-hollow-type tire comprising a flexible case around a hollow chamber, the flexible case comprising a sheath and a tread, the tread having a profile domed towards the outside of the tire; and
   the rim comprising an axial section shaped as a seat, suitable for receiving the tire, and an axial section shaped as a tool, suitable for scraping the seed drill disc, wherein
   the case includes at least a first sidewall, close to the tool section, connecting the sheath to the tread, this first sidewall extending radially or slightly inclined radially,
   the rim comprises an intermediate axial section which connects the tool section to the seat section, the intermediate section being shaped as an axial stop for the tire which is form fitted with the first sidewall, and
   the tire is mounted on the seat section by means of the sheath in an axially stressed state which maintains the first sidewall in contact against the axial stop.

2. The wheel according to claim 1, wherein the axial stop and the first sidewall each have a rectilinear profile.

3. The wheel according to claim 1, wherein the flexible case comprises one or more portions which protrude radially from the sheath or from the tread into the hollow chamber the portions being shaped as at least one radial stop for the tread.

4. The wheel according to claim 3, wherein at least one of the protruding portions projects from the sheath or from the tread by a height close to and greater than a height of the first sidewall.

5. The wheel according to claim 3, wherein the one or more protruding portions comprise at least two protruding portions facing one another project respectively from the sheath and from the tread by a cumulative height close to and greater than a height of the first sidewall.

6. The wheel according to claim 1, wherein
   the tread has a top portion,
   the case has a median plane, and
   the top portion is offset from the median plane, in a direction away from the first sidewall.

7. The wheel according to claim 1, wherein
   the tool section comprises two frusto-conical axial sections from an axial edge of the rim to the axial stop, and
   that of the sections which is closest to said axial edge is more inclined than the other relative to a radial direction.

8. The wheel according to claim 1, wherein
   the body comprises a first flange and a second flange mounted on top of each other,
   the first flange comprises at least the tool section and the axial stop section, and
   the second flange comprises at least a portion of the seat section.

9. The wheel according to claim 8, wherein
   the first flange further comprises at least a portion of the seat section, and
   the second flange comprises the rest of the seat section.

10. The wheel according to claim 1, wherein the flexible case includes a second sidewall, remote from the tool section, connecting the sheath to the tread.

11. The wheel according to claim 10, wherein the second sidewall extends radially or slightly inclined radially.

12. The wheel according to claim 10, wherein the second sidewall is in part at least significantly thicker than the first sidewall.

13. The wheel according to claim 10, wherein
   the tire has an annular groove, formed in the second sidewall, and
   the rim has a curved edge, engaged in the annular groove.

14. The wheel according to claim 1, wherein the seat section comprises at least one frusto-conical section which widens towards the tool section.

15. The wheel according to claim 1, wherein the body comprises a first flange and a second flange mounted on top of each other, the first flange including at least the tool section, the axial stop section and at least one frusto-conical section of the seat section.

16. The wheel according to claim 1, wherein the tire comprises an annular bead which projects from the flexible case where the first sidewall is connected to the tread.

* * * * *